W. P. DAWSON.
STANCHION.
APPLICATION FILED DEC. 15, 1910.
1,021,576.
Patented Mar. 26, 1912.
3 SHEETS—SHEET 1.
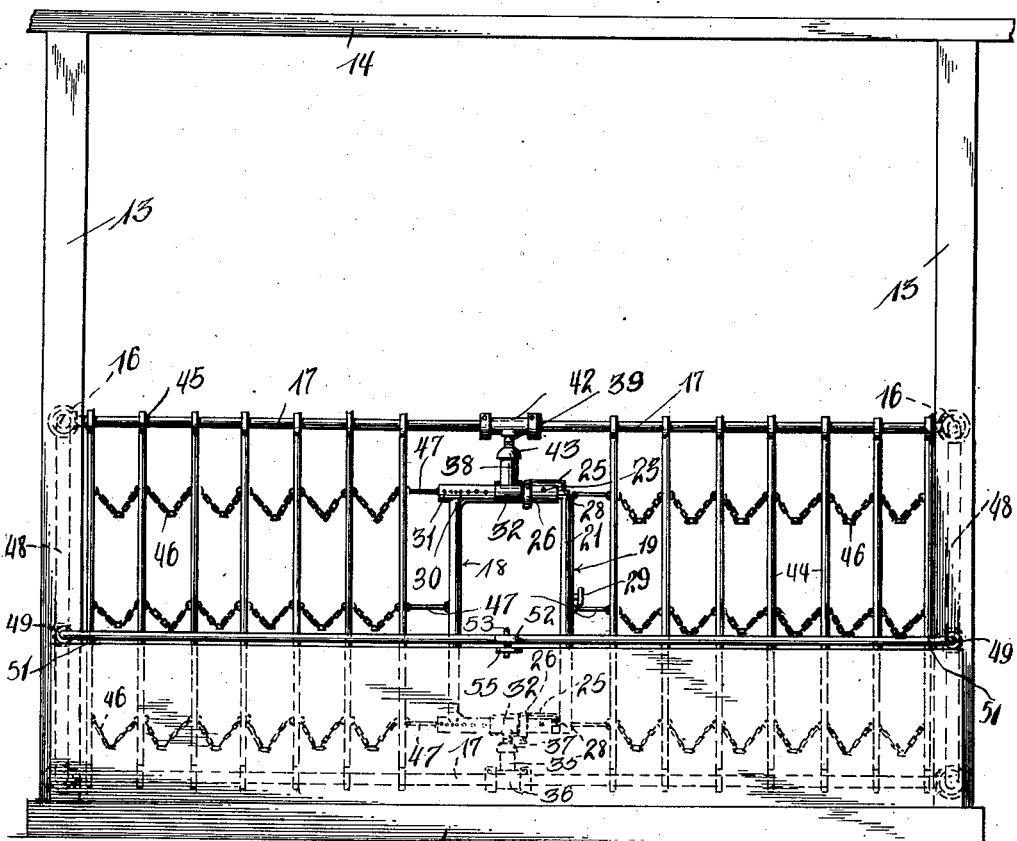
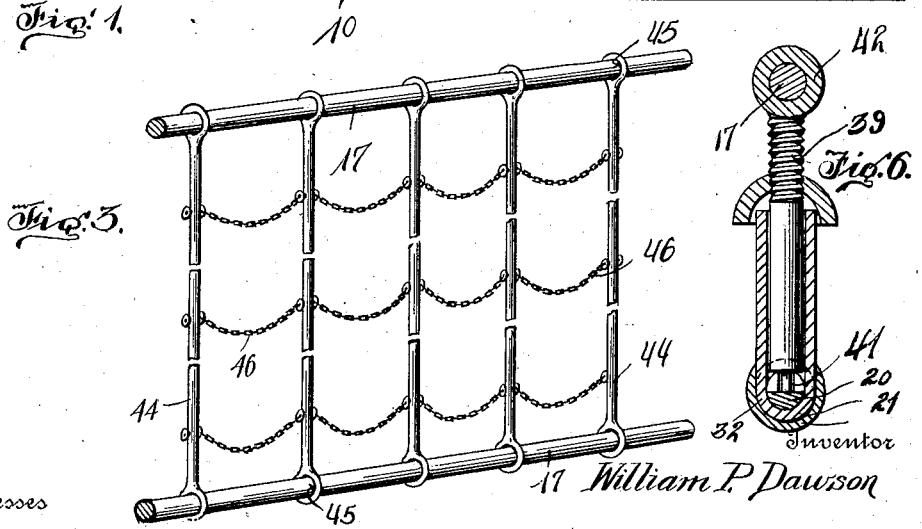
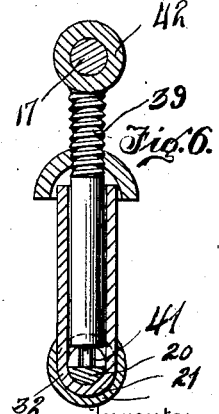

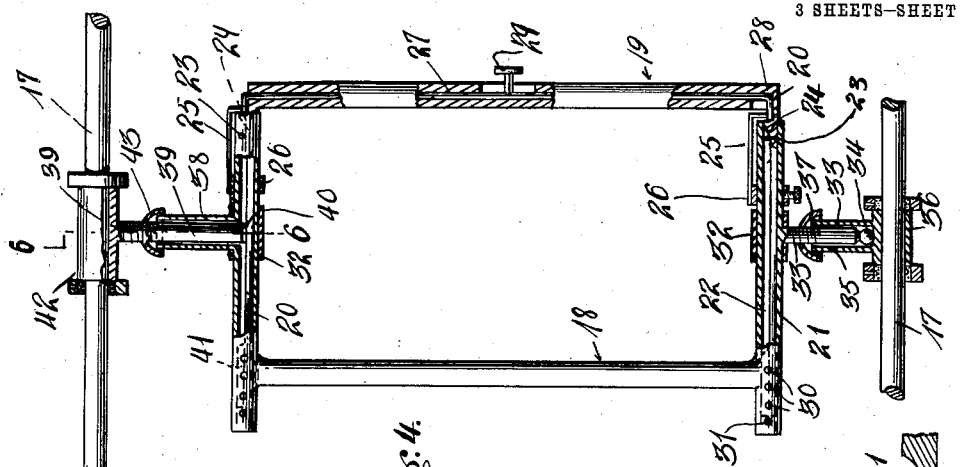
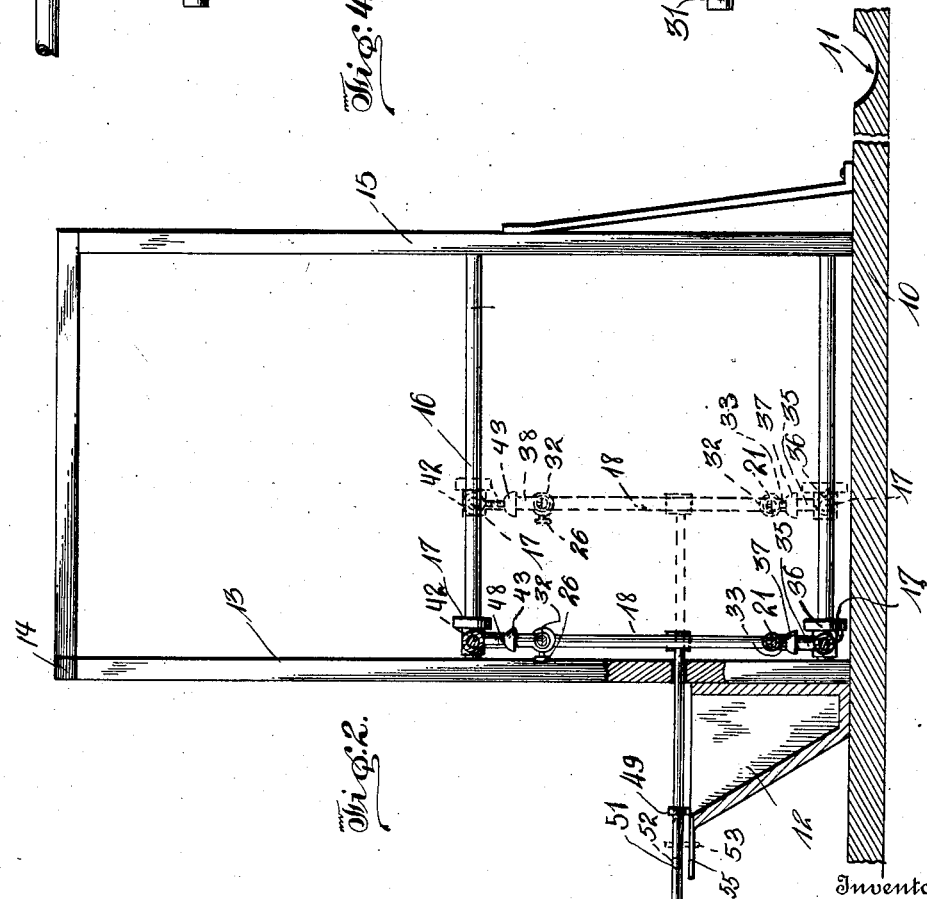

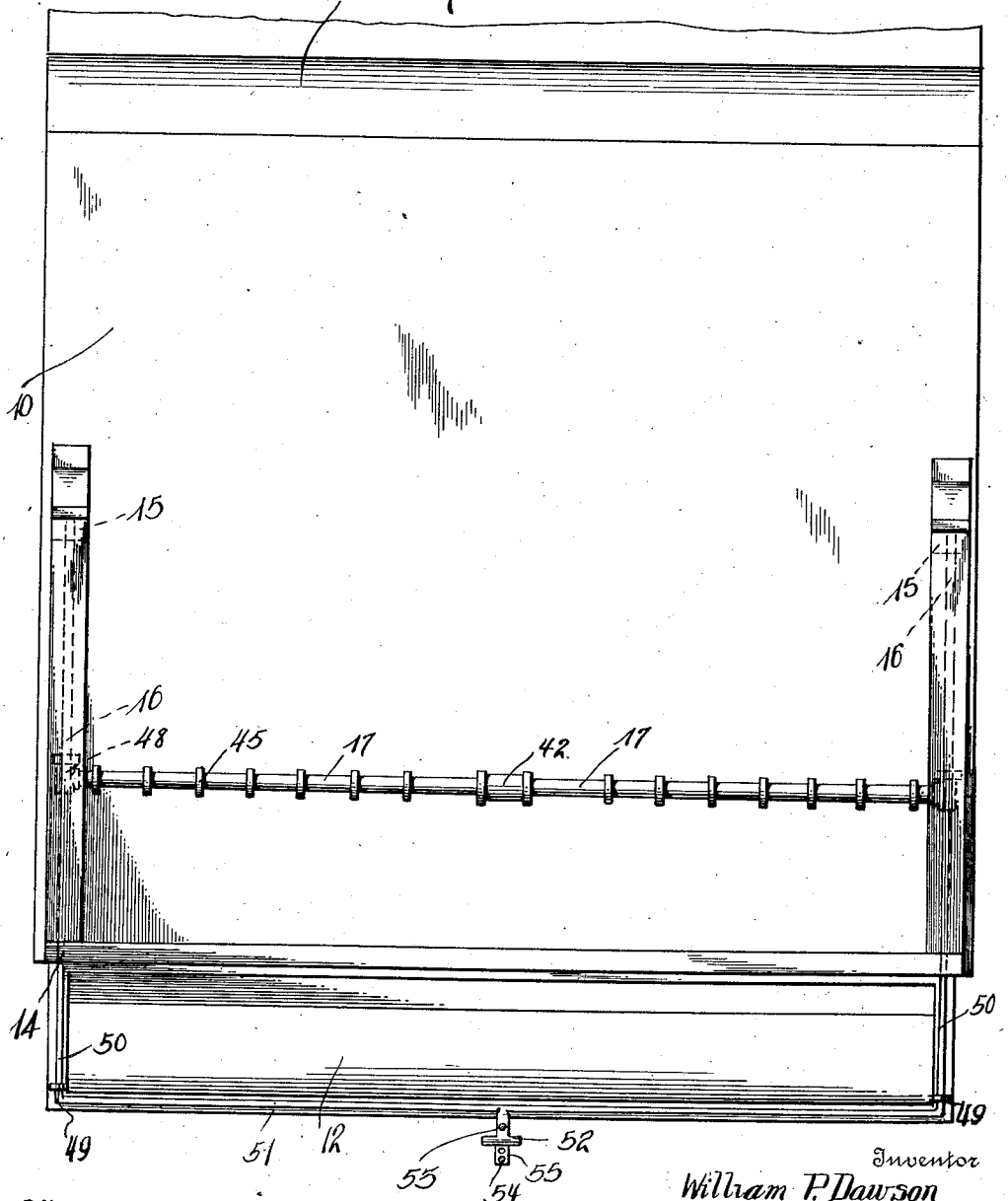

UNITED STATES PATENT OFFICE.

WILLIAM P. DAWSON, OF KAMLOOPS, BRITISH COLUMBIA, CANADA.

STANCHION.

1,021,576.   Specification of Letters Patent.   Patented Mar. 26, 1912.

Application filed December 15, 1910. Serial No. 597,524.

*To all whom it may concern:*

Be it known that I, WILLIAM P. DAWSON, a subject of the King of England, residing at Kamloops, in the Province of British Columbia, in the Dominion of Canada, have invented certain new and useful Improvements in Stanchions; and I do hereby declare the following to be a full, clear, and exact description of the invention, such as will enable others skilled in the art to which it appertains to make and use the same.

The invention relates to a stanchion and more particularly to the class of devices for confining cows or other stock.

The primary object of the invention is the provision of a stanchion in which an animal may be confined so that he will have free movement without possibility of becoming released from the stanchion and in this manner the animal may stand or lie down due to the range of movement while being confined by the stanchion.

Another object of the invention is the provision of a stanchion in which an animal may be confined so that he may have a considerable range of movement whereby the animal is free to stand or lie down and also that will enable the said animal to have access to a feed manger.

A further object of the invention is the provision of a stanchion of this character which will be sanitary, and one that is simple in construction, thoroughly reliable and efficient in operation and inexpensive in the manufacture.

With these and other objects in view, the invention consists in the construction, combination and arrangement of parts, as will be hereinafter more fully described in detail, illustrated in the accompanying drawings which disclose the preferred form of embodiment of the invention, to enable those skilled in the art to practice the invention, and as pointed out in the claims hereunto appended.

In the drawings:—Figure 1 is a front elevation of a stall with the invention mounted therein. Fig. 2 is a transverse vertical sectional view thereof. Fig. 3 is a fragmentary detail perspective view of the slidable curtain. Fig. 4 is an enlarged front elevation of the yoke of the stanchion and its slidable connections with the supporting bars, the yoke and connections being partly broken away. Fig. 5 is a top plan view of the stall and stanchion. Fig. 6 is a sectional view taken on the line 6—6 of Fig. 4.

Similar reference characters indicate corresponding parts throughout the several views in the drawings.

Referring to the drawings by numerals 10 designates a stall floor which may be constructed of cement or other suitable material provided with a drain or gutter 11, at the entrance end to the stall while at the other end of the stall and rising from the floor is arranged a feed manger 12 which may be of any desirable construction preferably extending entirely across the width of the floor.

Secured to opposite ends of the feed manger are vertical posts or uprights 13, which extend from the floor 10 to a point at a considerable distance above the manger and to the upper ends of these posts 13 is secured a cross beam 14 and to which latter and also the said posts 13 are connected side frames 15 the same being adapted to form division walls for the stalls.

Suitably fixed in the side frames 15 are horizontally disposed guide tubes 16 to which are slidably connected supporting tubes 17 which slidably support a yoke or stanchion comprising a frame formed of interfitting U-shaped tubular sections 18 and 19, the terminal or end extensions 20 of the frame 19 being telescoped within the terminal or end extensions 21 of the section 18 whereby the size of the frame may be increased or decreased as the occasion may require in a manner as will be hereinafter more fully described. The terminal extensions 20 of the section 19 are preferably solid and are cut away to form elongated notches 22 terminating a distance from the outer ends of the extensions and also a distance from the inner ends thereof, and which notches are engaged by cross pins 23 so as to prevent the section 19 from being separated from the section 18 when the stanchion frame is being adjusted to increase its size. At the inner ends of the notches 22 are formed keeper lugs 24 the same adapted to be engaged by hook shaped spring catches 25 extending from sleeves 26 slidably mounted upon the extensions 21 of the section 19, the said sleeves carrying suitable fasteners whereby they may be locked in adjusted position. In the vertical hollow portion of the section 19, is mounted a releasing rod 27 the same being formed with inturned ends 28 which normally lie beneath the nose portions or hook ends of the catches 25 so that upon raising the bar 27 the catches may be disengaged from the keeper lugs 24 for the adjustment of the section 19 relative to the section 18 the bar 27 being provided with a finger knob 29 the same working in a suitable elongated slot formed in the section 19 so that the knob may be manipulated for raising the bar to release the catches from the keeper lugs when desired. The sleeves are adapted to be adjusted upon the extensions 21 for engagement with the lugs 24 when the extensions 20 of the frame 19 are moved outwardly within the extensions 21 of the section 18, thereby holding the yoke in its adjusted position.

Contained in the extensions 21 of the section 18 are a series of spaced alining openings 30 for receiving adjusting pins 31 the same being adapted to intersect the path of movement of the extensions 20 of the section 19 so that inward movement thereof when telescoped within the extensions 21 will be prevented. Secured intermediate the ends of the extensions 21 of the section 18 are sleeves 32, the sleeve carried by the lower extension 21 being formed with a shank or spindle 33 provided with a ball terminal 34 which is rotatably fitted in a socketed tubular bearing 35 formed on a sleeve 36 slidably mounted upon the lower supporting tube 17 and fastened with the shank 33 is a dust cap or guard 37 the same overhanging the open end of the socketed bearing 35 to exclude dirt and dust therefrom, the ball terminal 34 being adapted to serve as a bearing ball to permit free turning of the stanchion frame. The upper sleeve 32 is formed with a socketed tubular bearing 38 the same opening into the hollow portion of the extension 21 of the section 18 and in this socketed bearing 38 is received a stem or shank 39 the outer end of which is formed with a lip or tongue 40 projecting into the notch of the upper extension 20 of the section 19 and this tongue 40 is adapted to engage in a groove 41 formed longitudinally in the outer end of the upper extension 20 when the said section 19 has been pulled outward to increase the size of the stanchion frame so that by the engagement of the tongue 40 in the groove 41 the said frame will be held against rotation or turning movement. The shank or stem 39 is formed integral with a sleeve 42 which is slidably mounted upon the upper supporting tube 17 and by reason of this sleeve and the sleeve 36 the said stanchion frame may be shifted longitudinally of the supporting tubes 17. Threaded upon the shank or stem 39 is a dust cap or guard 43 which latter overhangs the socketed bearing 38 and on turning the cap or guard 43 in one direction it will serve to take up the wear upon the bearing ball terminal of the shank 33.

Engaged with the supporting tubes 17 is a slidable curtain comprising a plurality of spaced vertical links 44 each being provided with an eye terminal 45 slidably embracing the supporting tubes 17, the said links being connected together by chains 46 which latter are normally slack so as to permit the lateral shifting of the yoke frame which is connected to the adjacent links 44 by means of horizontal links 47, the outer links 44 of the curtain being connected to vertical bars 48 by means of the chains 46 so that the curtain will not pull away from the side frames at either end thereof, these vertical bars 48 being slidably connected to the tubes 16 so that the stanchion frame and curtain may be shifted forwardly or rearwardly in the stall.

Rising from opposite ends of the feed manger 12 are guide eyes 49 in which are slidably mounted the end rails 50 of a shifting frame 51 which is adapted to move the curtain and stanchion yoke longitudinally in the stall to position the animal away from or adjacent to the feed manger, the end rails 50 being securely fastened to the vertical bars 48. Carried by the frame 51 is a bar 52 with a T-shaped handle, the shank portion of which is formed with a depending lug 53 adapted to engage in any one of a series of openings 54 contained in a resilient keeper plate 55 extending outwardly from and fixed centrally to the outer wall of the manger 12 so as to lock the stanchion yoke and the curtain in its shifted position. The shifting of the animal on movement of the stanchion yoke and curtain to the front or entrance portion to the stall will enable the said stall to be maintained sanitary.

What is claimed is:—

1. A stanchion comprising a frame structure, horizontally disposed supporting bars mounted in said frame structure, a yoke frame slidably connected with said supporting bars, and a curtain slidably connected with said supporting bars and fixedly connected to said yoke frame.

2. A stanchion of the class described comprising a frame structure, having opposite side sections, guide bars horizontally mounted in the side sections, horizontally disposed supporting bars slidably connected to the guide bars, and a yoke frame slidably connected to the supporting bars.

3. A stanchion of the class described comprising a frame structure, having opposite side sections, guide bars horizontally mounted in the side sections, horizontally disposed supporting bars slidably connected to the guide bars, a yoke frame slidably connected to the supporting bars, and a curtain slidably connected with the said supporting bars and also linked to the yoke frame.

4. A stanchion of the class described comprising a frame structure, having opposite side sections, guide bars horizontally mounted in the side sections, horizontally disposed supporting bars slidably connected to the guide bars, a yoke frame slidably connected to the supporting bars, a curtain slidably connected with the said supporting bars, and also linked to the yoke frame, the said yoke frame being provided with extensible sections.

5. A stanchion comprising a frame, guide bars mounted in the frame, supporting bars slidably connected with the guide bars, sleeves slidably connected to the supporting bars, and a yoke frame rotatably connected with the sleeves.

6. A stanchion comprising a frame, guide bars mounted in the frame, supporting bars slidably connected with the guide bars, sleeves slidably connected to the supporting bars, a yoke frame rotatably connected with the sleeves, and means for shifting the supporting bars on the guide bars.

7. A stanchion comprising a frame, guide bars mounted in the frame, supporting bars slidably connected with the guide bars, sleeves slidably connected to the supporting bars, a yoke frame rotatably connected with the sleeves, means for shifting the supporting bars on the guide bars, and means locking the said supporting bars in adjusted position.

8. A stanchion comprising a frame, guide bars mounted in the frame, supporting bars slidably connected with the guide bars, sleeves slidably connected to the supporting bars, a yoke frame rotatably connected with the sleeves, means for shifting the supporting bars on the guide bars, means for locking the said supporting bars in adjusted position, and a curtain supported by and slidable on the supporting bars.

In testimony whereof, I affix my signature, in presence of two witnesses.

WILLIAM P. DAWSON.

Witnesses:
GLADYS I. F. KELLY,
SIDNEY C. BURTON.

---

Copies of this patent may be obtained for five cents each, by addressing the "Commissioner of Patents, Washington, D. C."